UNITED STATES PATENT OFFICE.

GEORGE THOMPSON, OF EAST TARENTUM, PENNSYLVANIA.

IMPROVEMENT IN THE MANUFACTURE OF CAUSTIC ALKALIES.

Specification forming part of Letters Patent No. 15,951, dated October 21, 1856; reissue No. 654, dated February 1, 1859; reissue No. 2,571, dated April 16, 1867.

DIVISION C.

*To all whom it may concern:*

Be it known that I, GEORGE THOMPSON, late of East Tarentum, in the county of Allegheny and State of Pennsylvania, have invented a new and useful Improvement in the Manufacture of Caustic Alkalies; and I do hereby declare the following to be a full and exact description thereof.

My invention consists in a new article of manufacture, viz., caustic alkalies (soda or potassa) inclosed in a metallic integument or casing, forming a new article of commerce and manufacture, which may be preserved and transported, and thus introduced into general use for domestic and other purposes where those concentrated alkalies, owing to their peculiar chemical properties, were not, prior to my invention, susceptible of being transported and preserved for use. The hydrated alkalies of soda and potassa, commonly known as caustic soda and potassa, would prove very useful for domestic and other purposes; but owing to the fact that they speedily deliquesce after being exposed, even for a short time, to the action of atmospheric air, and that by their caustic property they attack and destroy almost everything with which they are allowed to come in contact in their deliquescent state, it has been found impossible practically to manufacture these articles in a condition for transportation and preservation for general use.

I have discovered that, by inclosing or incasing caustic alkali tightly in metallic integuments or casings, the deliquescence may be prevented, and the caustic alkali may be preserved practically for any length of time, and transported without destruction or accident.

When it is desired to prepare the article for family use only, I inclose in each metallic integument or casing such quantity of caustic alkali as it would be desirable to use in a family at each single occasion; and one mode which I adopted and found to answer well for inclosing the material in a metallic integument is, to provide boxes or canisters of sheet-iron, or other metal, made tight at the joints with infusible cement or otherwise; and into these I pour the caustic alkali in a molten state until they are nearly or quite full. The lid is then pressed down, so as to exclude air or moisture, and is secured by cement or otherwise.

Having thus described my invention, what I claim as new, and desire to secure by Letters Patent, as a new article of manufacture, is—

Caustic alkali incased or enveloped in a tight metallic integument or metallic casing, substantially as above described.

GEORGE THOMPSON.

Witnesses:

GEO. E. BUCKLEY,

J. E. SHAW.